United States Patent [19]

Nishiguchi

[11] 4,409,666
[45] Oct. 11, 1983

[54] ELECTRONIC DESK-TOP CALCULATOR WITH INDICATION FUNCTION OF STORED DATA RANGE

[75] Inventor: Yukihiro Nishiguchi, Tokyo, Japan

[73] Assignee: Nippon Electric Co., Ltd., Tokyo, Japan

[21] Appl. No.: 271,905

[22] Filed: Jun. 9, 1981

Related U.S. Application Data

[63] Continuation of Ser. No. 72,816, Sep. 5, 1979, abandoned.

[30] Foreign Application Priority Data

Sep. 5, 1978 [JP] Japan .............................. 53-109455

[51] Int. Cl.³ .............................................. G06F 3/14
[52] U.S. Cl. ................................................. 364/710
[58] Field of Search ........................ 364/710, 200, 900

[56] References Cited

U.S. PATENT DOCUMENTS

| 3,428,793 | 2/1969 | Scuitto ............................... 364/710 |
| 3,878,380 | 4/1975 | Tsuiki ................................. 364/710 |
| 3,974,497 | 8/1976 | Ohkawa et al. .................. 364/710 X |
| 3,983,380 | 9/1976 | Sharif et al. ........................ 364/710 |

Primary Examiner—David H. Malzahn
Attorney, Agent, or Firm—Sughrue, Mion, Zinn, Macpeak, and Seas

[57] ABSTRACT

An improved electronic desk-top calculator provided with a warning function, whereby when data processed by an operator exceed a predetermined value, the operator can recognize it. The calculator comprises a plurality of memory means, a plurality of key means for accessing the memory means, a display means for indicating the accessed memory means, means for judging whether the content of the accessed memory is within a predetermined range and means responsive to the judging means for selectively modulating the display means.

20 Claims, 12 Drawing Figures

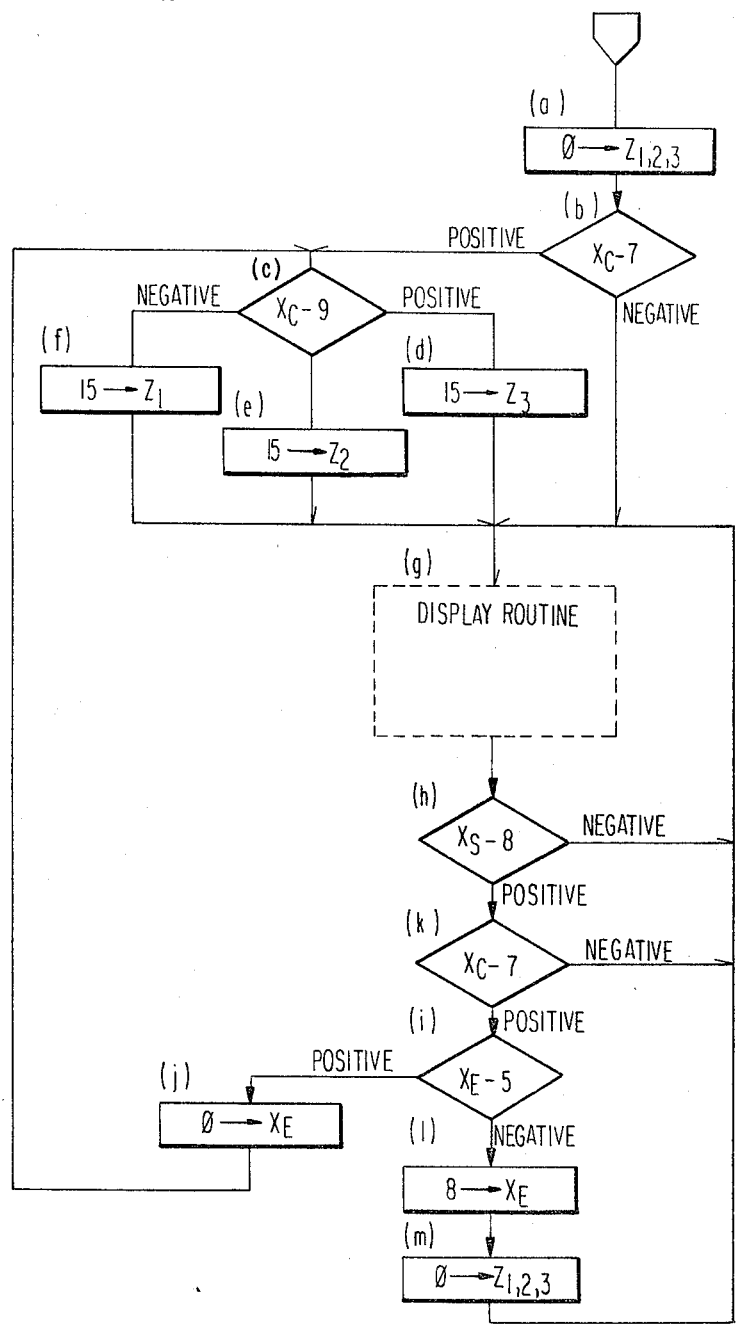

FIG 5
(a) 
(b) 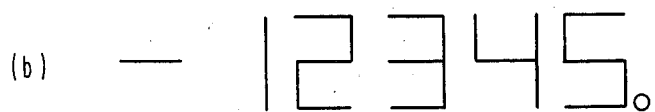
(c) 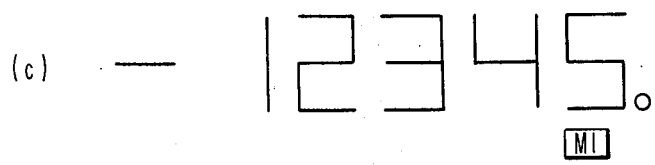
FIG 6
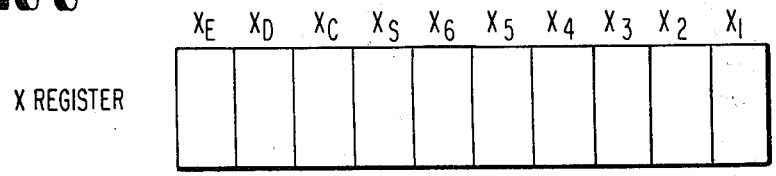
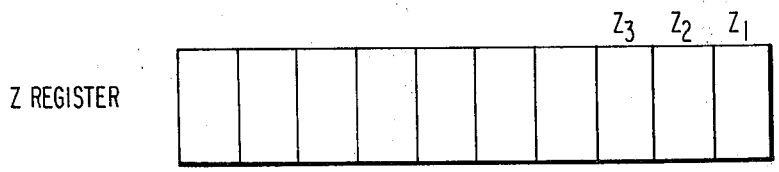
FIG 7
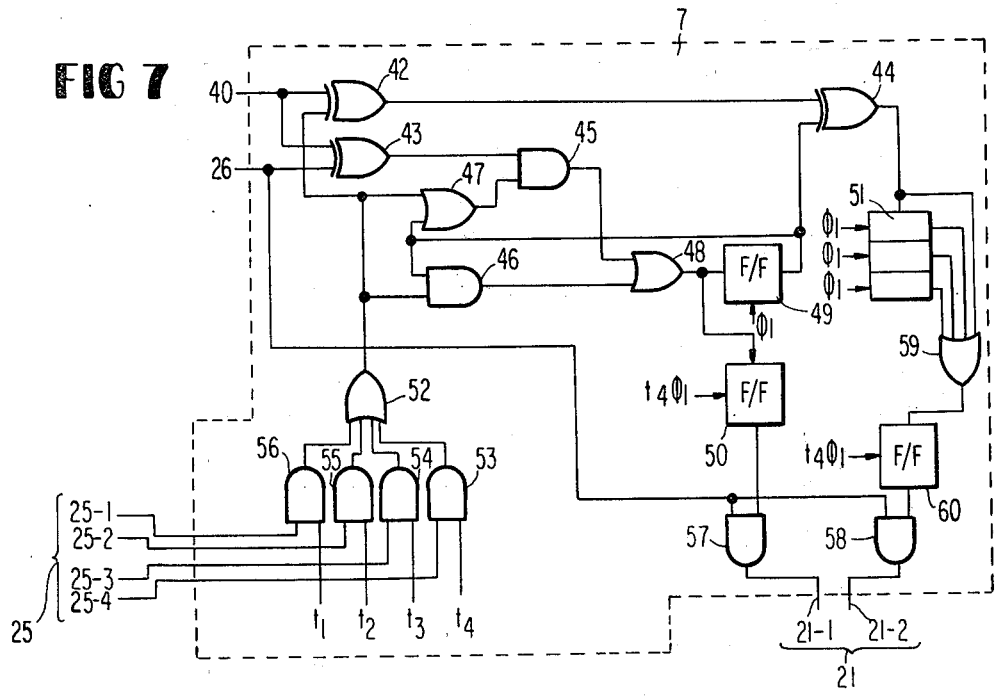

FIG 8
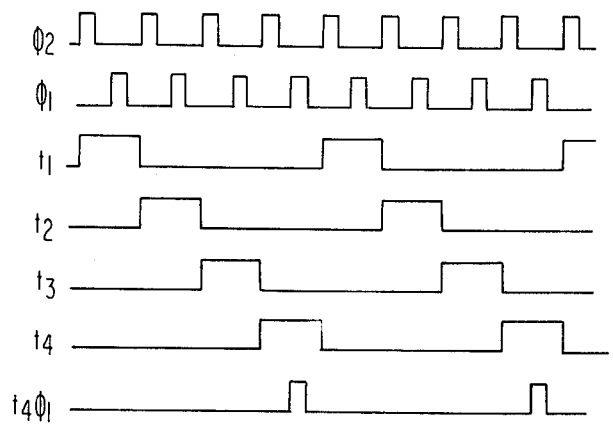
FIG 9
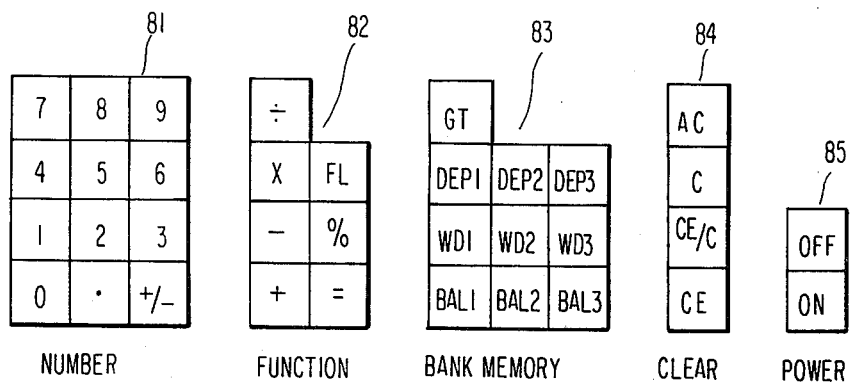
FIG 10

ELECTRONIC DESK-TOP CALCULATOR WITH INDICATION FUNCTION OF STORED DATA RANGE

This is a continuation of application Ser. No. 72,816, filed Sept. 5, 1979, now abandoned.

The present invention relates to an electronic desk-top calculator (hereinafter referred to as "calculator").

Calculators are generally equipped with one or more storage apparatus (hereinafter referred to as "memories") for storing numerical data. Conventional calculators indicate a state of "Memory in Use" to an operator by using a memory loading lamp, or a memory symbol mark (hereinafter referred to as "memory mark") when numerical data other than "0" is stored in the memory. The calculators equipped with the memories are provided with keys (hereinafter called "memory keys") to call data from at least one memory and execute an arithmetic operation such as addition and subtraction based on the data. When the operator uses the memory keys and carries on the arithmetic operation, contents stored in the memories sometimes unexpectedly change to exceed a desired number. However, in the conventional calculator, the memory mark is simply displayed during the entire period through the use of the memory even if the memory contents exceed the desired number, without warning the operator. Therefore according to the conventional calculator when, for instance, a memory is storing a game score, no problem occurs as long as the score is a positive number. However, a problem results if the score is a negative number.

An object of this invention is to provide a calculator which can effectively indicate the memory state to the operator when it reaches a predetermined condition by operating a memory key.

A calculator according to the present invention comprises a plurality of memory elements, a display for indicating the memory elements used by the operator, a group of keys for controlling the memory, and a judging section for determining whether the contents of the memory exceed a predetermined value. When the stored values of the memory processed by the operator exceed the predetermined condition, the output of the judging section renders the display distinguishable from the state that the content is under the predetermined value.

According to the invention, there is provided an electronic desk-top calculator comprising a plurality of memory elements for independently storing data, a plurality of keys for designating the memory. A first display is used for displaying data of the designated memory and a second display is used for displaying the designation of the memory. The system also detects if the content of the designated memory is outside a predetermined range, and an actuator responsive to the detecting circuit renders the second display means distinguishable from the state that the content of the designated memory is within the predetermined range.

According to the present invention, there is also provided an electronic desk-top calculator comprising a plurality of memories and a plurality of keys for accessing the memories. A display including data display elements and a plurality of memory marks indicate the memory accessed by the keys. The content of the accessed memory is detected to determine if it exceeds a predetermined condition, and a circuit responsive to an output of the determination selectively modulates the display of memory mark relevant to the accessed memory.

In a calculator according to the present invention, the operator can recognize the condition of the accessed or designated memory especially when it exceeds the predetermined condition.

FIG. 3 is a display flowchart showing a display operation of the present invention;

FIG. 4 shows key codes for the memory addition keys;

Figure 1:
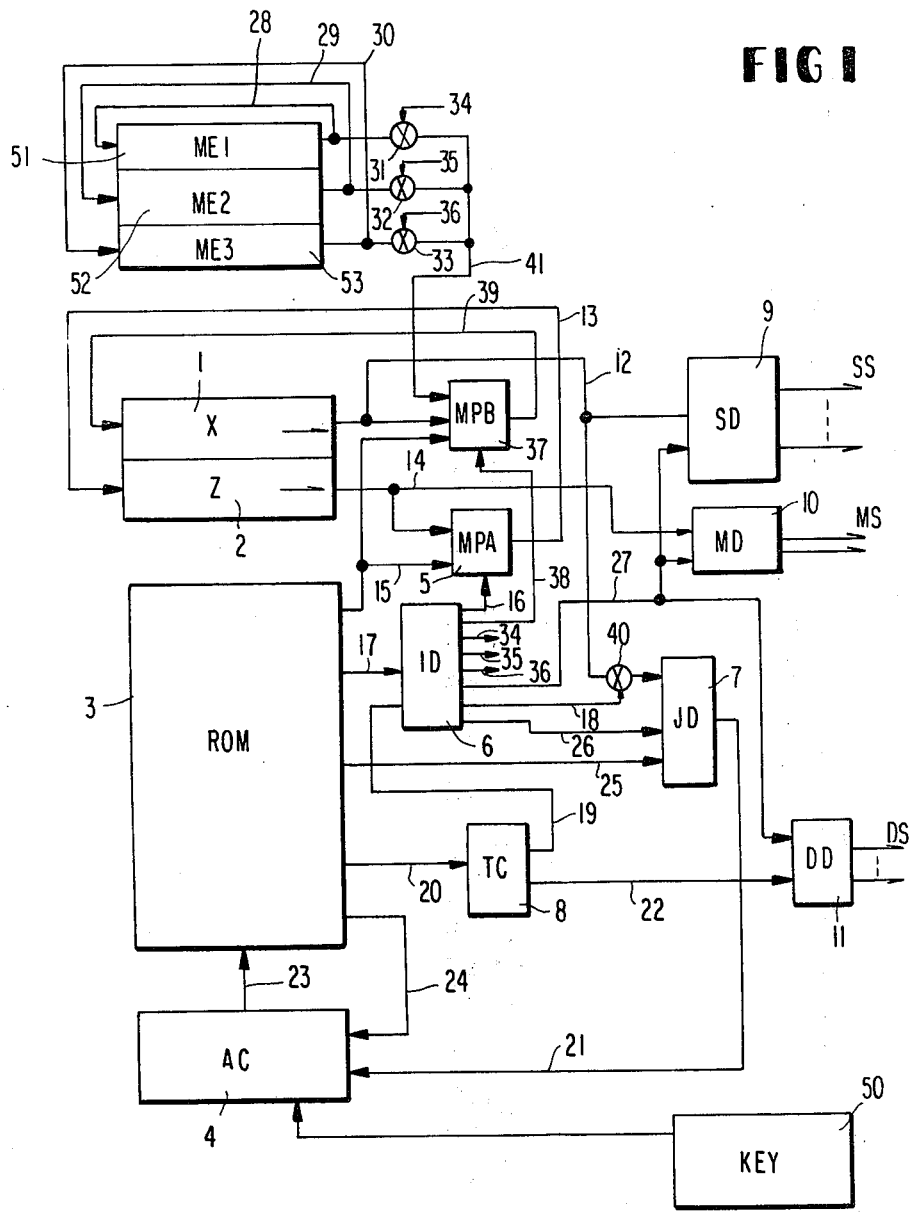
FIG. 1 is a block diagram showing the calculator configuration according to an embodiment of the invention.

FIGS. 5(a)-(c) show flashing of a memory mark in the embodiment of the present invention;

FIG. 6 is a block diagram showing the configurations of X and Z registers;

FIG. 7 is a block diagram showing the judgment circuit in FIG. 1;

FIG. 8 is a time chart showing timing signals used in the judgment circuit of FIG. 7;

FIG. 9 shows a keyboard of a calculator according to the present invention; and

FIG. 10 shows the display section according to the present invention.

An embodiment of the present invention will now be explained by referring to FIGS. 1 through 8.

In this embodiment, three memories ME1~ME3 51~53 are employed, and when any of these memories become negative, the relevant memory mark in the display flashes.

Figure 2:
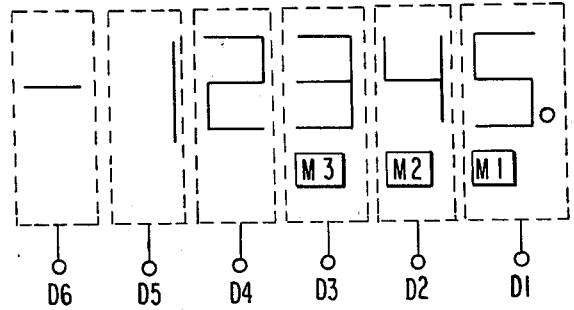
FIG. 2 is a pattern diagram showing a display format according to the embodiment of the invention.

In FIG. 1, an X register 1 stores numerical data, decimal data, and the polarity code of the numerical data which are displayed, key code, and data used for a condition decision. An output of the X register 1 is fed back to its input through a select circuit (MPB) 37 and is coupled to an input of a segment drive circuit (SD) 9 through a feed line 12. The output of the X register 1 is also coupled to an input of a judgment circuit (JD) 7 through the line 12 and a gate 40. Z register 2 stores the positions of memory marks M1, M2 and M3 in the display. As shown in FIG. 2, the pattern example of the display apparatus consists of numerical data (i.e. −12345.) of the X register 1 and memory marks M1~M3 of the Z register 2. The memory marks M1, M2 and M3 are handled in the same manner as that for each segment for the numerical data in the first, second and third digits in response to digit signals D1, D2 and D3. X and Z registers are controlled by the same timing. Each digit of the X and Z registers consists of four bits respectively weighted 1-2-4-8. The output of Z register 2 is coupled to the memory mark drive circuit (MD) 10 and select circuit (MPA) 5.

As shown in FIG. 6, both of the X and Z registers consist of 10 digits, and X register 1 assigns six digits X1 to X6 for numerical data, while Z register 2 allocates three digits Z1 to Z3 to memory marks. A read-only memory (hereinafter referred to as "ROM") 3 stores operational instructions and controls each circuit based on signal information of outputs 15, 17, 20, 24 and 25 (output for each piece of instruction). Output 15 is coupled to the select circuit (MPA) 5 and the select circuit (MPB) 37. Outputs 17, 20, 24 and 25 are respectively coupled to an instruction decoder (ID) 6, a timing counter (TC) 8, an address counter (AC) 24 and a judgment circuit (JD) 7.

The address counter 4 designates the address to which ROM 3 should proceed next (hereinafter referred to as "next address") based on the output 24 of ROM 3 and the output 21 of the judgment circuit (JD) 7. Though, the next address is produced basically from the output 24 of ROM 3, the output 21 of the judgment circuit (JD) 7 affects the next address, and the next address is determined and fed to ROM 3 through an output line 23. A keyboard including a memory key is coupled to the address counter (AC) 4. The select circuit (MPA) 5 connects the output 14 of Z register 2 to output line 13 to perform a close loop for circulating Z register 2 when an output 16 of the instructions decoder (ID) 6 is disabled. When the output 16 is enabled, the select circuit (MPA) 5 connects the output 15 of ROM 3 to the output line 13. The select circuit (MPB) 37 is controlled by an output 38 of the instruction decoder (ID) 6 to couple one of the output 15 of ROM 3, the output 12 of X register 1 and an output line 41 with an output line 39 coupled to the input of the X register. When the output 38 is disabled, the output 12 of the X register is coupled with the output line 39 to circulate the X register.

The instructions decoder (ID) 6 receives an output 17 from ROM 3 and controls output lines 16, 18, 26 and 27 based on the output 17 only during the period in which an output 19 of the timing counter (TC) 8 is enabled. An output line 16 from the instruction decoder (ID) 6 is coupled to a control input of the select circuit (MPA) 5. An output 27 from the instruction decoder (ID) 6 is enabled to activate a segment drive circuit (SD) 9, a memory mark drive circuit (MD) 10 and a digit signal drive circuit (DD) when the output 17 from ROM 3 is a display instruction. The segment drive circuit (SD) 9 produces numerical segment signals SS and the memory mark drive circuit (MP) 10 produces memory mark signals MS, while the digit signal drive circuit (DD) produces digit signals DS (which are detailed as $D_1$ to $D_6$ in the following).

When an output 18 from the instruction decoder (ID) 6 is enabled, the gate 40 is open to couple the output 12 of the X register with an input of the judgment circuit (JD) 7. When an output 26 from the instruction decoder (ID) 6, the judgment circuit (JD) 7 is activated to perform a comparison operation between an output 25 from ROM 3 and the output 12. The comparison operation is performed by subtracting numeral data produced at the output 25 from the numeral data at the output 12. The judgment circuit (JD) 7 produces an output 21 of "+1", "0" and "−1" respectively when the resultant comparison is positive, 0 and negative. Therefore, in response to the resultant comparison, the next address is selected among three possible addresses. While, when the output 26 from the instruction decoder (ID) 6 is disabled, the output 21 of the judgment circuit takes only "0". Therefore, the next address is determined only by the output 24 from ROM 3.

Memories (ME1∼ME3) 51∼53 consist of shift-registers storing numerical data and circulating through output lines 28∼30 respectively which are constructed as in the manner of X register 2. The output lines 28 to 30 are coupled to the input of the select circuit (MPB) 37 through gate circuits 31 to 33 and an output line 41, respectively. The gates 31 to 33 are respectively controlled by output signals 34 to 36 from the instruction decoder (ID) 6. The enabled control signals 34 to 36 make the gates 31 to 33 open, respectively. A timing counter (TC) 8 generates timing signals for synchronizing operations of the whole circuit. An output 22 of the timing counter (TC) 8 is fed to the digit signal drive circuit (DD) 11, while an output 19 thereof is fed to the instruction decoder (ID) 6 to enable it in response to the output 20 from ROM 3.

The segment drive circuit (SD) 9 drives the display apparatus by converting the numerical data with decimal data derived from the X register 1 into segment signals matching segment character forms of the display apparatus. The memory mark drive circuit (MD) 10 drives the display segments of the memory marks while the output of Z register 2 is "15". The digit signal drive circuit (DD) 11 supplies the digit signals D1, D2, D3, D4, D5, and D6 to the display apparatus in response to the timing signals from the timing counter (TC) 8, which correspond to the digits D1 to D6 in FIG. 2. Each drive circuit actuates each output line when output 27 of the instructions decoder (ID) 6 is enabled.

The calculator is utilized by operating keys. For distinguishing each key, depressions of key are converted into memory designation numeric data and are processed using numbers called key codes as shown in FIG. 4. The key codes are stored in a digit location called Xc of X register 1 as shown in FIG. 6. The polarity code of the numerical data of the X register 1 is stored in a digit location called Xs in the X register 1. When the polarity of the numerical data of X register 1 is negative, "Xs = 8" is stored and "Xs = 0" for when the polarity of the data is positive. The numerical data is stored in the digit locations X1 to X6. The decimal point data is stored in the digit location XD. The digit location XE is auxiliary used for controlling display operation. Digit locations Z1, Z2 and Z3 in the Z register 2 are controlled synchronously with the digit locations X1 to X3.

Assume that the addition keys "M+1" for the memory (ME1) 51 is operated and the resultant sum is a negative number. "8" will be stored in the digit location Xs in the X register 1. The resultant sum is stored in the memory (ME2) 52. After the addition, the output 20 from ROM 3 makes the timing counter (TC) 8 activate during the period corresponding to the digits X1, X2 . . . X6, XS and XD to produce timing signals. The timing signals are fed to the instruction decoder (ID) 6 via the output 19. The instruction decoder (ID) 6 enables the output 34 to open the gate 31, to thereby couple the output line 28 of the memory (ME1) 51 with the output line 41. Thus, the content of the memory (ME1) 51 is transferred to the X register via the gate 31 and the select circuit (MPB) 37 and stored in the digits X1 to X6, XS and XD. At this time, the judgment circuit (JD) 7 is disabled to produce the output 21 of "0" and hence the next address is designated by the output 24 from ROM 3.

The following operation of the calculator will now be described with reference to FIG. 3. After the transferring of the memory (ME1) to the X register 1, the address wherein "0" is stored in the digits Z1, Z2 and Z3 (0→Z1, 2, 3) in the Z register 2 as shown at step (a) is introduced. At step (a), the output 17 from ROM 3 designate the instruction decoder (ID) 6 the instruction (0→Z1, 2, 3), while the output 20 from ROM 3 makes the timing counter (TC) 8 activate during the period corresponding to the digits Z1 to Z3 and numeral "0" is produced from the output 15 and fed to the select circuit (MPA) 5. Thus, the output 15 of "0" is introduced to the digits Z1 to Z3 in the Z register through the select circuit (MPA) 5. Other data stored in the digits other than Z1 to Z3 remains unchanged. In this step, the output 21 of the judgment circuit (JD) 7 remains at "0" since the output 26 from ROM is not enabled.

Then the output 24 designates the address storing the step (b) wherein numeral "7" is subtracted from the digit Xc which stores numeral "8" in response to the depression of the key M+1 as shown in FIG. 4. In this address, the outputs 20 of ROM 3 actuates the output 19 of the timing counter (TC) 8 only during the timing of Xc and the output 17 actuates the output 18 of the instructions decoder (ID) 6 only during the timing of Xc to open the gate 40. The output 25 has provided numeral "7" which is a subtract number with the judgment circuit. The output 15 has "0" which means that no output has been made so that the select circuits (MPA, MPB) 5 and 37 are not enabled. Accordingly, the judgment circuit executes the subtraction of (Xc−7) at the Xc timing. In this subtraction, the content of the digit Xc remains unchanged. A resultant difference "1" is produced from the output 21 and is added to the output 24 to designate the next address of the address counter (AC) 4, in which the next address numeral "9" is subtracted from the digit Xc as shown at step (c). In the step (c), the output 26 of the instruction decoder (ID) 6 enables the judgment circuit (JD) 7 during the timing of Xc. While "8" is transferred to the judgment circuit from the X register 1 through the gate 40 and "9" is produced from the output 25 of ROM 3 at the Xc timing. Thus the judgment circuit (JD) 7 performs the subtraction (8− 9) to produce a resultant difference "−1" of a negative number at the output 21. Therefore, this negative-number of output 21 designates and the output 24 of ROM 3 designates the instruction (15→ Z1) shown as step (f) in FIG. 3, wherein numeral "15" is stored in the digit Z1.

In step (f), the timing counter TC8 actuates the output 19 during the timing corresponding to the digit Z1 in response to the output 20 of ROM 3, while numeral "15" to be stored in Z1 is produced at the output 15. The instruction decoder (ID) 6 enables the output 16 in response to the output 17 of ROM and the output 19 during the timing of Z1, to store "15" in the Z1 digit of the Z register by the select circuit (MPA) 5. Digits other than Z1 of the Z register remain unchanged. Then, the display routine shown at step (g) is designated by the output 24 of ROM. In the step (g), numerical data with decimal point and polarity to be displayed is prepared based on the contents of the digits Xs, Xc and X1 to X6. Then, the instruction decoder (ID) 6 enables the output 27 to activate the segment drive circuit (SD) 9, the memory mark drive circuit (MD) 10 and the digit signal drive circuit (DD) 11 which receive the timing signals from the timing counter (TC) 8, to display the prepared data.

An example of the display is shown in FIG. 5(a), wherein the data is "−12345.". The display of FIG. 5(a) shows that the numerical data is a negative number, and a mark "M1" is lit for showing the use of the memory (ME1) 51. While marks "M2" and "M3" are are not lit in response to the digit Z2 and Z3 of "0". The step (g) is retained during the predetermined period e.g. 1 second. After the termination of the predetermined period, the address counter is advanced to the address where "8" is subtracted from the content of the digit Xs as shown at step (h) by the output 24 of ROM 3. In the step (h), the output 20 of ROM 3 enables the output 19 of the timing counter (TC) 8 only during the digit timing corresponding to the digit Xs and the output 25 produces a signal representing numeral "8" and provides it with the judgment circuit (JD) 7.

The output 26 of the instruction decoder (ID) 7 based on the output 17 makes the judgment circuit (JD) 7 subtract "8" from the digit Xs. A resultant difference "0" is obtained at the output 21 and hence the output 24 of ROM 3 and the output 21 advance the address counter (AC) 4 to the address where "7" is subtracted from the digit Xc as shown at step (k). Step (k) is similarly performed as in step (b). The resultant difference is a positive number ("1") and hence the output 21 of the judgment circuit (JD) 7 and the output 24 of ROM 3 control the address counter to designate the address where "5" is subtracted from the digit XE in the X register shown at step (i). Step (i) is similarly performed by changing the digit timing corresponding to the digit Xs used in the step (h) to the digit timing corresponding to the digit XE and by changing numeral "8" to "5" at the output 25.

While the content of the digit XE is initially always "0" and hence the judgment circuit subtracts "5" from "0" (0−5) to obtain a resultant difference of "−5". Therefore the judgment circuit (JD) 7 produces "−1" at the output 21. Then the address counter (AC) 4 is designated by the outputs 21 and 24 to the address where "8" is stored in the digit XE as shown at step (l). In step (l), the output 20 of ROM controls the timing counter (TC) 8 to enable the output 19 thereof during the digit timing corresponding to the digit XE and "8" is produced from the output 25 and transferred to the select circuit (MPB) 37. The output 38 of the instruction decoder is enabled to couple the output 15 of ROM with the output line 39 at the digit timing of XE. Accordingly, "8" produced at the output 15 is stored in the digit XE through the select circuit (MPB) 37. The digits of the X register other than the digit XE remain unchanged. In this instance, the output 26 is not enabled and hence the judgment circuit (JD) 7 produces a signal of "0" at the output 21.

The next address determined by the output 24 is the address where "0" is stored in the digits Z1 to 3 as shown at step (m). Step (m) (0−Z1.2.3.) is similarly performed as in the manner of step (a). Then, the outputs 24 and 21 introduce the display routine (g). In this rountine (g), the contents of digits Z1, Z2 and Z3 are "0" and hence the memory mark drive circuit (MD) 10 is disabled. Therefore, the memory mark "M1" is not displayed as shown in FIG. 5(b). After the predetermined period (e.g. one second), steps (h) and (k) are successively re-introduced. Then, the step (i) is re-introduced. At step (i), the content of the digit XE has been made "8" at the preceeding step and the judgment circuit (JD) 7 produces a resultant positive difference "3" at the output 21 thereof. Therefore, the outputs 21 and 24 introduce the address where "0" is stored in the digit XE as shown at step (j). Step (j) is similarly performed by change the numeral "8" at the output 25 used in the step (l), to "0". Then, step (C) (Xc−9) is re-introduced. At step (C), the content of the digit Xc is "8" and hence step (f) is introduced. Then, at the display routine (g), the content of the digit Z1 is "15" and hence the memory mark "M1" is displayed as shown in FIG. 5(c) during the predetermined period.

Thus, by repeating the foregoing operations, the memory mark M1 corresponding to the memory ME1 is periodically displayed i.e. flashed with the intervals of operating times required for the display routine (g). By adjusting the operating time of the display routine (g), the flashing period of the memory mark can be set freely. The same operations for controlling the memory mark M2 and M3 can apply to the memories ME2 and ME3, and all the conditions for them are the same except that step (e) for ME2 and step (d) for ME3. Therefore, the memory marks M2 and M3 can be flashed in a period set by the display routine (g).

By setting key codes other than those for the memory key group below 6, the display routine (g) is directly accessed after step (a) when the keys other than the memory keys are depressed. And the routine (g) is continuously circulated through the steps (h) and (k). At this time, the Z register 2 shows only "0", and each memory mark will remain unlit.

As stated, the present invention permits the user to recognize a change in the content of the memory promptly by flashing each memory mark for example when a positive number turns into a negative number after the operations of the memory key group. Now, with reference to FIGS. 7 and 8, a preferred embodiment of the judgment circuit (JD) 7 employed in the invention will be described.

In FIG. 1, the output 25 of ROM 3 in FIG. 1 consists of four output lines 25-1, 25-2, 25-3, and 25-4 respectively weighted by 1-2-4-8 which are coupled to first inputs of AND gates 56, 55, 54 and 53 respectively. Second inputs of an AND gates 56 to 53 are respectively supplied with bit timing signals t1 to t4 as shown in FIG. 8. Outputs of AND gates 56 to 53 are delivered to inputs of OR gate 52. An output of OR gate 52 is coupled to a first input of an exclusive OR gate 42 and to an input of an OR gate 47. A second input of the exclusive OR gate 42 receives the output from the gate 40 in FIG. 1. A second input of the exclusive OR gate 43 receives the output 26 from the instruction decoder (ID) 6 in FIG. 2. Outputs of the exclusive OR gate 43 and the OR gate 47 are coupled with inputs of an AND gate 45. Outputs of an AND gates 45 and 46 are respectively inputted to two inputs of an OR gate 48. An output of an OR gate 48 is delivered to an input of a flip-flop 49 shifted by a clock signal $\phi 1$ and to an input of a flip-flop 50 shifted by a timing t4 $\phi 1$.

An output of the flip-flop 49 is fed to a first input of an exclusive OR gate 44 and to inputs of the OR gate 47 and the AND gate 46. A second input of the exclusive OR gate 44 receives an output of the exclusive OR gate 42. An output of the exclusive OR gate 44 is fed to an input of a 3-bit shift-register 51 shifted by the clock signal $\phi 1$ and to an input of an OR gate 59. Each stage of outputs of the shift-register 51 is fed to other inputs of the OR gate 59. An output of the flip-flop 50 is fed to an input of an AND gate 57 receiving the output 26 at its another input. An output of the OR gate 59 is fed to an input of a flip-flop 60 shifted by the timing t4 $\phi 1$. An output of the flip-flop 60 is fed to an input of an AND gate 58 receiving the output 26 at its another input. Outputs 21-1 and 21-2 of the AND gates 57 and 58 are fed to the address counter (AC) 4 as its output 21 in FIG. 2.

One example of operation of the judgment circuit of FIG. 7 will be described with reference to FIG. 8 where the step (b) in FIG. 3 is performed. In response to the depression of the key M+1, "7" is produced at the output 25 and the AND gates 56, 55, 54 and 53 are succeedingly opened respectively by the timing signals t1, t2, t3 and t4 so that the output of the OR gate 52 succeedingly produces "1, 1, 1, 0" respectively in response to the timing signals t1, t2, t3 and t4. The gate is open to provide the data "8" of the digit Xc with the inputs of the exclusive OR gates 42 and 43. The data "8" is represented as "0, 0, 0, 1" respectively at the timing signals t1, t2, t3 and t4. The flip-flop 49 stores "0". The output 26 is enabled to be "1" and hence the outputs 21-1 and 21-2 are dependent on the outputs of the flip-flops 50 and 60 respectively. At timing t1, the output 40 is "0" and the output of the OR gate is "1" and hence the outputs of the exclusive OR gates 42, 43 and 44, the output of the OR gate 47, the output of the AND gate 46 and the output of the OR gate 48 are respectively 1, 1, 1, 1, 0 and 1. Accordingly, in response to the clock signal $\phi$ at the timing t, "1" is written into the flip-flop 49 and the first stage of the shift-register 51. At timing t2, the outputs of the gate 40, the gate 52 and the flip-flop 49 are respectively 0, 1, 1 and hence the outputs of the gate 42, the gate 43, the gate 47, the gate 46, the gate 45, the gate 48 and the gate 44 become 1, 1, 1, 1, 1, 1 and 0 respectively. Therefore in response to the clock signal $\phi 1$ at the timing t2, the second stage and first stage of the shift-register 51 and the flip-flop 49 respectively store 1, 0 and 1.

At the timing t3, the outputs of the gate 40, the gate 52 and the flip-flop 49 respectively become 0, 1 and 1. Therefore, in response to the clock signal $\phi$ at the timing t3 third, second and first stages of the shift-register 51 store respectively 1, 0 and 0, and the flip-flop 49 stores 1. At the timing t4, the outputs of the gate 40, the gate 52 and the flip-flop 49 are respectively 1, 0 and 1 and hence the outputs of the gate 42, the gate 43, the gate 47, the gate 46, the gate 45, the gate 48, the gate 44 and the gate 59 become respectively 1, 0, 1, 0, 0, 0, 0 and 1. The flip-flops 50 and 60 store 0 and 1 respectively in response to the clock signal $\phi$ at the timing t4. Therefore, 0 and 1 are produced respectively at the outputs 21-1 and 21-2 in response to a clock signal $\phi 2$ at the following timing t1 and mean "+2".

In the foregoing implementation example, the flashing of the symbol marks was performed by alternately rewriting the control codes of the registers. However, this can be substituted by periodically gating the display signals for flashing by output signals of an oscillating means.

A calculator equipped with a bank account management function that can be realized by the present invention will be explained with reference to FIGS. 9 and 10.

FIG. 9 shows the keyboard configuration of the calculator having the bank account management function. Key group 81 is a group of numerical keys, whereas key group 82 is a group of function keys. Still another key group 83 is a group for bank account management keys. Another key group 84 is a group of keys for clear control. Key 85 is a power supply switch. The functioning of key group 83 for bank management will be explained. In this calculator, three accumulator memories M1~M3 (not shown in the diagram) are provided by corresponding them respectively to bank accounts. The deposit keys DEP1—DEP3 have the function of depositing in the bank accounts, that is, of memory-adding in the bank accounts, operational results or other displayed contents inputted by the number keys. The results of each transaction are displayed. As an example, when the deposit key DEP2 is pressed while some data is displayed, the displayed contents are added to the contents of the memory M2, and the result of the addition is displayed. At this time, a display symbol 62 showing that the memory M2 is being used is continuously displayed in the display section shown in FIG. 8.

Similarly when the deposit key DEP1 or DEP3 is depressed and memory M1 or M3 is used, the symbol 61 or 63 is displayed.

Withdrawal keys WD1, WD2 and WD3 handle displayed contents given by input or operation as withdrawals from the relevant account. When the withdrawal key WD2 is depressed, the displayed content at such a time is subtracted from the memory M1 corresponding to the particular bank account. The result of this operation is displayed, and the memory symbol mark 61 in the display section shown in FIG. 8 is displayed continuously. Similarly, the withdrawal keys WD2 and WD3 subtract the displayed contents from memories M2 and M3 corresponding to the bank accounts Nos. 2 and 3, respectively. The subtracted result is displayed on the display section, at the same time displaying the memory symbol mark 62 or 63.

The balance keys BAL1, BAL2 and BAL3 show the contents per se of the three bank accounts, that is, balances. By depressing the balance key BAL1, the content of the memory M1 corresponding to its bank account No. 1 is recalled and is displayed, at the same time displaying the memory symbol 61. The grand total key GT displays the whole total of the bank account balances. By depressing the grand total key GT, the total of all the balances of the memories M1~M3 corresponding to the bank account Nos. 1~3 is displayed, at the same time displaying all the memory symbols 61~63. The contents of the memories do not change at this time.

The present invention is applied to the memories M1~M3 so that the operator may recognize the condition of the memory, especially whether the contents are positive or negative. The decision is made whether the displayed contents are positive or negative after either a deposit key, withdrawal key, balance key, or grand total key, is pressed. Unless the decision result is negative, the symbol is continuously displayed. In case the judgment result at this time is negative, the symbol is flashed, to positively indicate to the operator that the account in question is negative. The configuration shown in FIGS. 1 and 2 can be utilized directly to structure such control. It is desirable to use nonvolatile devices for memories M1~M3, or a backup power source, for holding information even if the power supply is cut off, for a calculator with such an account management function.

I claim:

1. An electronic calculator comprising: a plurality of first memory means for independently storing data, key means, second memory means, a plurality of transfer means respectively coupled between said first memory means and said second memory means, first means responsive to actuation of said key means for selectively enabling one of said transfer means to transfer data stored in an associated one of said first memory means to said second memory means, third memory means for storing address information of said associated one of said first memory means, first display means coupled to said second memory means for displaying data stored in said second memory means, second display means having a plurality of display patterns provided in correspondence to said plurality of first memory means respectively, second means responsive to said address information stored in said third memory means for operatively energizing one of said display patterns, means for determining if the content of said associated one of said first memory means is outside a predetermined range, third means for supplying a data representing said predetermined range to said determining means, fourth means for supplying the content of said second memory means to said determining means, and fifth means responsive to said determining means for controlling said second means when the content of said associated one of said first memory means is outside of said predetermined range to render the energizing manner of said one of said display patterns distinguishable from the energizing manner when the content of said associated one of said first memory means is within said predetermined range.

2. The calculator as claimed in claim 1, wherein said second display means is continuously energized when said content is within said predetermined range and said second display means is periodically energized when said content is outside said predetermined range.

3. The calculator as claimed in claim 1, in which said key means includes numeral keys, and function keys.

4. An electronic desk-top calculator comprising: a plurality of first memory means, a plurality of input means provided in correspondence to said plurality of first memory means, second memory means, transfer means responsive to actuation of one of said input means for operatively transferring the content of associated one of said first memory means to said second memory means, display means including data display elements and a plurality of memory mark elements, means for driving said data display elements in response to the content of said second memory means, means for energizing one of said memory mark elements in correspondence to address of said associated one of said first memory means, means for determining whether data supplied thereto exceeds a predetermined value, means for supplying said determining means with the content of said second means, and means responsive to output of said determining means for controlling said energizing means so as to modulate energizing manner for the energized memory mark element.

5. An electronic calculator comprising: a plurality of memory means, a plurality of input means for addressing said memory means, display means capable of displaying a visual pattern indicating both the content of addressed memory means and the address information of the addressed memory means, transfer means responsive to said input means for operatively supplying said display means with the content of the addressed memory means, determining means determining whether data supplied thereto is within a predetermined range, means responsive to said input means for supplying said determining means with data derived from said addressed memory means, and means responsive to the output of said determining means for changing the displaying manner of at least a part of said visual pattern without changing said visual pattern itself.

6. The calculator of claims 5 further comprising an instruction memory for controlling operations of said determining means.

7. The calculator of claim 6, wherein said determining means comprises first logic means receiving control signals from said instruction memory, second logic means receiving a first input from said first logic means and a second input indicative of information stored in said accessed memory means and providing a sequence of outputs in accordance with timing signals, and a third logic means receiving said sequence of outputs and producing an output to actuate said display means.

8. The calculator of claim 7, wherein said first logic means comprises an array of AND gates receiving a weighted output from said instruction memory and a second input comprising bit timing signals, and an OR gate receiving respective outputs from individual gates in said array of AND gates, whereby a weighted output signal indicative of the instruction to be performed is produced.

9. The calculator as claimed in claim 5, wherein said display means comprises a first display portion indicative of data in said memory means and a second display portion for indicating which of said plurality of memory means is being accessed.

10. The calculator of claim 9, wherein said second display portion comprises a plurality of memory mark elements.

11. In an electronic calculator having a plurality of memory means for independently storing data, display means, key means for designating one of said memory means, and control means responsive to an output of said key means for supplying said display means with address information of the designated memory means and information representing the content of said designated memory means, said display means including a first portion indicative of address information of said designated memory means and a second portion for indicating the content of said designated memory means, the improvement comprising: first means for determining whether said content of said designated memory means is within a predetermined range, means for operatively supplying said first means with said content of said designated memory means, second means for operatively energizing said display means, and third means responsive to an output of said first means for controlling said second means for changing the energizing manner of said first portion of said display means without changing a displayed pattern in said first portion.

12. The calculator according to claim 11, in which said first portion is continuously energized when said content is inside said predetermined range and said first portion is periodically energized when said content is outside of said predetermined range.

13. The calculator according to claim 12, in which said predetermined range is a positive range of numeral data.

14. The calculator according to claim 13, in which said second portion of said display means includes a plurality of digits of numerical display elements.

15. The circuit according to claim 14, said control means comprising store means for storing data to be displayed on said display means and means for transferring the content of said designated memory means to said store means in response to said key means.

16. The circuit according to claim 11, in which said first portion is statically displayed when said content is inside said predetermined range and said first portion is flickered when said content is outside said predetermined range.

17. The circuit according to claim 16, in which said predetermined range is a positive numeral range.

18. An electronic desk-top calculator comprising at least one memory means, input means for accessing said memory means, display means, means responsive to said input means for supplying said display means with the content of said memory means, means for determining whether data supplied thereto is in a positive numeral range, means responsive to said input means for operatively supplying said determining means with the content of said memory means and means responsive to said determining means for controlling energizing manner of said display means, wherein a visual pattern to be displayed on said display means is continuously displayed when said content is in the positive numeral range and said visual pattern flickers when said content is in a negative numeral range.

19. An electronic calculator comprising a plurality of memory means, a plurality of input means for addressing said memory means, display means including data display portion and memory indication portion for indicating an addressed memory means by said input means, means responsive to said input means for selectively supplying said display means with the content of said addressed memory means, means for determining if the content of said addressed memory means is negative, and means responsive to said determining means for controlling the displayed manner of said display means.

20. The calculator according to claim 19, in which said memory indication portion is continuously displayed when said content is zero or more and said memory indication portion is flickered when said content is less than zero.

* * * * *